(12) United States Patent
Tchelepi

(10) Patent No.: US 9,471,344 B1
(45) Date of Patent: Oct. 18, 2016

(54) HARDWARE SUPPORT FOR PROCESSING VIRTUAL MACHINE INSTRUCTIONS

(71) Applicant: Marvell International Ltd., Hamilton (BM)

(72) Inventor: Ghassan M. Tchelepi, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 339 days.

(21) Appl. No.: 13/850,975

(22) Filed: Mar. 26, 2013

Related U.S. Application Data

(60) Provisional application No. 61/616,325, filed on Mar. 27, 2012.

(51) Int. Cl.
*G06F 9/455* (2006.01)
*G06F 12/08* (2016.01)

(52) U.S. Cl.
CPC ......... *G06F 9/4552* (2013.01); *G06F 9/45533* (2013.01); *G06F 12/0875* (2013.01)

(58) Field of Classification Search
CPC ............. G06F 9/30174; G06F 9/4552; G06F 9/45533; G06F 12/0875; G06F 8/48
See application file for complete search history.

(56) References Cited

U.S. PATENT DOCUMENTS

| | | | | |
|---|---|---|---|---|
| 6,532,531 | B1 * | 3/2003 | O'Connor | G06F 9/30021 711/6 |
| 6,826,749 | B2 * | 11/2004 | Patel et al. | 717/148 |
| 7,853,776 | B2 | 12/2010 | Yamada | |
| 8,826,074 | B2 * | 9/2014 | Bauer et al. | 714/25 |
| 2002/0188825 | A1 * | 12/2002 | Seal | G06F 9/45504 712/209 |
| 2003/0023958 | A1 * | 1/2003 | Patel | G06F 9/30174 717/146 |
| 2009/0055821 | A1 * | 2/2009 | Grcevski et al. | 718/1 |
| 2011/0010721 | A1 * | 1/2011 | Gupta et al. | 718/103 |
| 2013/0247034 | A1 * | 9/2013 | Messerli | 718/1 |
| 2014/0007098 | A1 * | 1/2014 | Stillwell et al. | 718/1 |
| 2014/0149978 | A1 * | 5/2014 | Subramanya et al. | 718/1 |

OTHER PUBLICATIONS http://en.wikipedia.org/wiki/ARM_architecture, ARM architecture, Wikipedia, the free encyclopedia, downloaded Feb. 11, 2013, 21 pages.
http://www.lua.org/about.html, Lua: about, Last update Feb. 6, 2013, downloaded Feb. 11, 2013, 3 pages.

* cited by examiner

*Primary Examiner* — Lewis A Bullock, Jr.
*Assistant Examiner* — Jacob Dascomb

(57) ABSTRACT

The present disclosure includes systems and techniques relating to providing hardware support for processing virtual machine instructions. In some implementations, an apparatus, systems, or methods can include an interface for a system-on-chip (SOC), a memory device, a central processing unit (CPU) coupled with the interface and the memory device, where the CPU can be configured to process instructions defined by a first instruction set and to direct instructions defined by a second instruction set to the memory device, and processing hardware coupled with the interface and the memory device, where the processing hardware can be separate from the CPU and configured to retrieve and process the instructions defined by the second instruction set, and where the second instruction set can be different from the first instruction set, and the instructions defined by the second instruction set include code of a predefined virtual machine environment.

14 Claims, 4 Drawing Sheets

HARDWARE SUPPORT FOR PROCESSING VIRTUAL MACHINE INSTRUCTIONS

CROSS REFERENCE TO RELATED APPLICATIONS

This application claims priority to U.S. Provisional Application Ser. No. 61/616,325 titled "SOC HARDWARE ACCELERATION SUPPORT FOR LUA VM (VIRTUAL MACHINE)," filed on Mar. 27, 2012, the disclosure of which is incorporated herein by reference in its entirety.

TECHNICAL FIELD

The subject matter of this application is generally related to providing hardware support for processing virtual machine instructions.

BACKGROUND

Many electronic devices include embedded systems with central processor units (CPUs) to control the operation of the devices providing greatly enhanced functionality and operational flexibility. An embedded system can include firmware (a combination of persistent memory and program code and/or data stored in the memory) that provides a control program for the electronic device.

A virtual machine can be embedded in the firmware, which is a software emulation of a machine environment (e.g., a computer system) that executes applications and operations like a physical machine. For example, a virtual machine can emulate architecture and functions of a computer platform to allow cross-platform execution of applications or operations. The CPU executes the virtual machine, including a software component of the virtual machine that processes instructions corresponding to a virtual machine instruction set. The execution of the virtual machine with all of its components can be resource intensive and create processing overhead for the CPU, such as an ARM architecture CPU. In addition, the ARM architecture has included the capability to directly execute Java bytecode in some implementations.

SUMMARY

The present disclosure includes systems and techniques relating to providing hardware support for processing virtual machine instructions. According to an aspect of the described systems and techniques, a system includes an interface for a system-on-chip (SOC), a memory device, a central processing unit (CPU) coupled with the interface and the memory device, where the CPU is configured to process instructions defined by a first instruction set and to direct instructions defined by a second instruction set to the memory device, and processing hardware coupled with the interface and the memory device, where the processing hardware is separate from the CPU and configured to retrieve and process the instructions defined by the second instruction set. The second instruction set can be different from the first instruction set, and the instructions defined by the second instruction set include code of a predefined virtual machine environment.

In some implementations, the system can also include an interpreter, where the interpreter can be configured to convert scripting code conforming to the predefined virtual machine environment to generate the instructions defined by the second instruction set, and where the CPU can be configured to execute the interpreter. In some implementations, the memory device can be a cache memory device coupled with the processing hardware and configured to cache the instructions defined by the second instruction set retrieved from an additional memory device through which the CPU has directed the instructions defined by the second instruction set.

According to another aspect of the described systems and techniques, a method can include directing, by a central processing unit (CPU), instructions defined by a first instruction set to a memory device, where the CPU is configured to process instructions defined by a second instruction set, retrieving, by processing hardware, the instructions defined by the first instruction set, where the processing hardware is separate from the CPU, and processing, by the processing hardware, the retrieved instructions defined by the first instruction set, where the first instruction set is different from the second instruction set, and the instructions defined by the first instruction set comprise code of a predefined virtual machine environment.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, storage devices (e.g., a solid state drive system (SSD), etc.), a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The systems and techniques described in this specification can be implemented so as to realize one or more of the following advantages. A virtual machine, such as the Lua virtual machine, uses a software component to decode and execute virtual machine instructions. Since the virtual machine is conventionally executed by a central processing unit (CPU), the decoding and execution of the virtual machine instructions creates overhead for the CPU, and thus, may reduce CPU performance for other operations. The integration of processing hardware, for executing virtual machine instructions, that is separate from the CPU on a system-on-chip (SOC) can improve the performance of the SOC when executing virtual machine operations for various applications (e.g., games, internet applications, databases, robotics, SSD, etc.).

For example, data storage devices (e.g., SSD) can be subject to extensive testing during manufacturing to map out defects in order to facilitate the delivery of a reliable end product (e.g., a typical self-test for a storage device can take up to 24 hours). The self-test of data storage devices can be implemented through a virtual machine where the CPU is executing the virtual machine that interprets the source code scripts for the self-test into virtual machine instructions (e.g., virtual machine bytecode). The processing (e.g. decoding and execution) of the virtual machine instructions for performing the self-test of the data storage devices by processing hardware (e.g., a virtual machine execution unit) that is separate from the CPU can offload the CPU and reduce the duration of the data storage device self-test.

The processing hardware configured to execute the virtual machine instructions can be implemented to offload device self-diagnostic processes to Lua virtual machine scripts. The Lua virtual machine scripts can be transient and may be updated without altering the main firmware of the SOC.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems and techniques described herein can be implemented as one or more devices, such as one or more integrated circuit (IC) devices, which can be included in an electronic data storage device.

Figure 1:
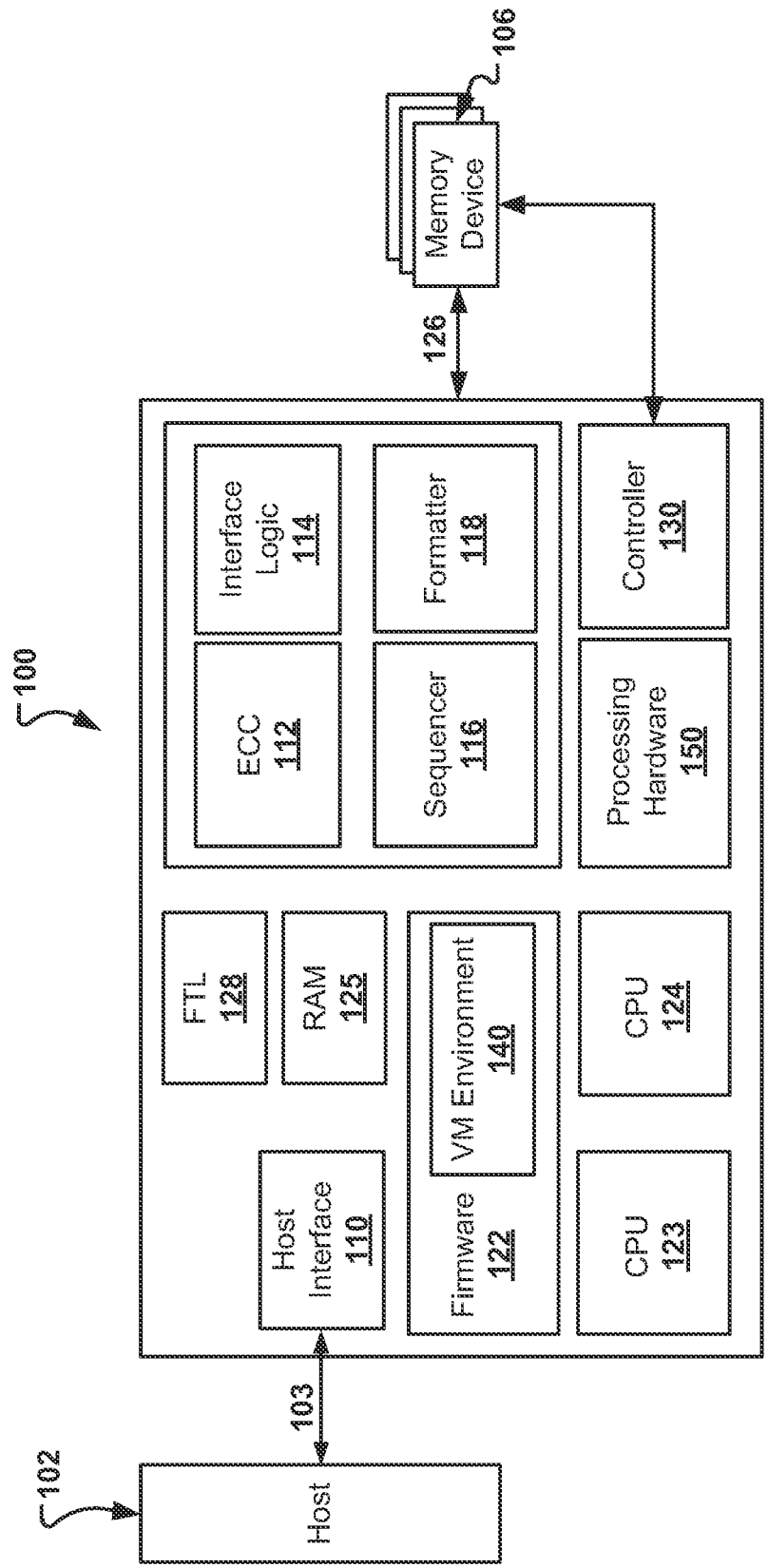
FIG. 1 shows an example of a system-on-chip (SOC).

FIG. 1 shows an example of a system on chip (SOC) 100. As shown in FIG. 1, the SOC 100 can include a host interface 110, one or more central processor units (CPU), such as CPUs 123 and 124, a flash transition layer (FTL) 128, a memory controller 130 and a memory 125, e.g., a Random Access Memory (RAM) or Read Only Memory (ROM).

A host 102 can be coupled with the host interface 110 and communicate with the SOC 100 through the host interface 110. The host interface 110, in some implementations, can include a Serial Advanced Technology Attachment (SATA) interface or a Parallel Advanced Technology Attachment (PATA) interface. A SATA interface or PATA interface can be used to convert serial or parallel data into parallel or serial data, respectively. For example, if the host interface 110 includes a SATA interface, then the SATA interface can receive serial data transferred from the host 102 through a bus 103 (e.g., a SATA bus), and convert the received serial data into parallel data. In other implementations, the host interface 110 can include a hybrid interface. In these implementations, the hybrid interface can be used in conjunction with, for example, a serial interface.

The host interface 110, in some implementations, can include one or more registers in which operating commands and addresses from the host 102 can be temporarily stored. The host interface 110 can communicate a program or read command to the SOC in response to the stored information in the register(s).

As shown in FIG. 1, the SOC 100 can include the host interface 110, an error correction code (ECC) module 112, interface logic 114, a sequencer 116, a formatter 118, CPUs 123 and 124, firmware 122, and a memory controller 130. The CPUs 123 and 124 can include a microprocessor, a signal processor (e.g., a digital signal processor) or microcontroller. In some implementations, the components of the SOC 100 can communicate through the interface logic 114 and a buffer manager (not shown) to access devices, such as internal memory devices and/or external memory devices coupled with the SOC 100.

In some implementations, the firmware 122 can include machine instructions that can be executed by the CPU(s) to implement an embedded virtual machine environment 140 (e.g., a Lua virtual machine environment developed by Pontifical Catholic University of Rio de Janeiro, Brazil). A virtual machine environment can be used to execute code (e.g., bytecode) across different platforms without changing the scripting language. The CPU(s) (e.g., CPU 123 and/or 124) can be configured to execute the embedded virtual machine environment.

In some implementations, the SOC 100 can be coupled with one or more memory device(s) 106, such as flash memory devices, through one or more channels 126 that can be configured to receive one or more control signals (e.g., four chip-enable signals) or read, program or erase data or commands from the host 102 or from the memory device(s) 106.

The SOC 100 can be configured to handle any suitable command, status, or control request for access to the memory device(s) 106. For example, the SOC 100 can be configured to manage and control storage and retrieval of data in the memory device(s) 106. To initialize a read, program or erase operation, the SOC 100 can receive one or more service requests or commands (e.g., read, program and erase requests) from the host 102 (or from the memory controller 130). In some implementations, the SOC 100 can be a part of a microcomputer system under the control of a microprocessor (not shown).

In some implementations, the SOC 100 can include the memory device(s) 106 (e.g., Static Random Access Memory (SRAM), Synchronous Dynamic Random-Access Memory (SDRAM), Double Data Rate SDRAM (DDR SDRAM), etc.) and/or the host 102. Even though the SOC 100 and memory device(s) 106 are shown as separate components in FIG. 1, the memory device(s) 106 can be mounted on a common circuit board with the SOC 100, or in some cases, integrated therewith.

The SOC 100 can include a processing hardware 150 (e.g., virtual machine execution engine) separate from the CPUs 123 and 124, system logic, cache memory and cache controller for processing program code and data. The program code and data associated with the embedded process system can be stored in the memory device(s) 106, and communicated to the SOC through, for example, an SOC interface (not shown). The SOC interface can be used by a translator for translating information flowing between the interface and the internal bus structure of the SOC. Control signals can flow from the SOC to the memory device(s) 106 while instructions and data can flow from the memory device(s) 106 to the SOC during read operations. Instructions and data also can be sent to the memory device(s) 106 during program operations.

The processing hardware 150 can be configured to execute instructions (e.g., bytecode) corresponding to an instruction set conforming to the virtual machine. In some implementations, the CPU(s) 123 and/or 124 can generate the instructions defined by the virtual machine from a virtual machine source code script and save the virtual machine instructions to a memory device, such as memory device(s) 106 or memory 125. The location within the memory device(s) 106 for storing the virtual machine instructions can be predefined. The CPU(s) 123 and/or 124 and the processing hardware 150 can share the same memory device(s) 106. The CPU(s) 123 and/or 124 can instruct the processing hardware 150 to retrieve and process the virtual machine instructions. The processing hardware 150 can retrieve the stored virtual machine instructions and process, e.g., decode and execute, the virtual machine instructions independently of the CPU(s) 123 and/or 124.

In some implementations, the processing hardware 150 can be a writable control store (WCS) device. A WCS device can store microcode (e.g., a virtual machine) in RAM rather than in ROM or hard-wired logic, and thus, allows for updating, patching and/or customizing the stored microcode. In some implementations, the processing hardware 150 can be hardwired directly into the SOC, such as ROM or hardwired logic.

Figure 2:
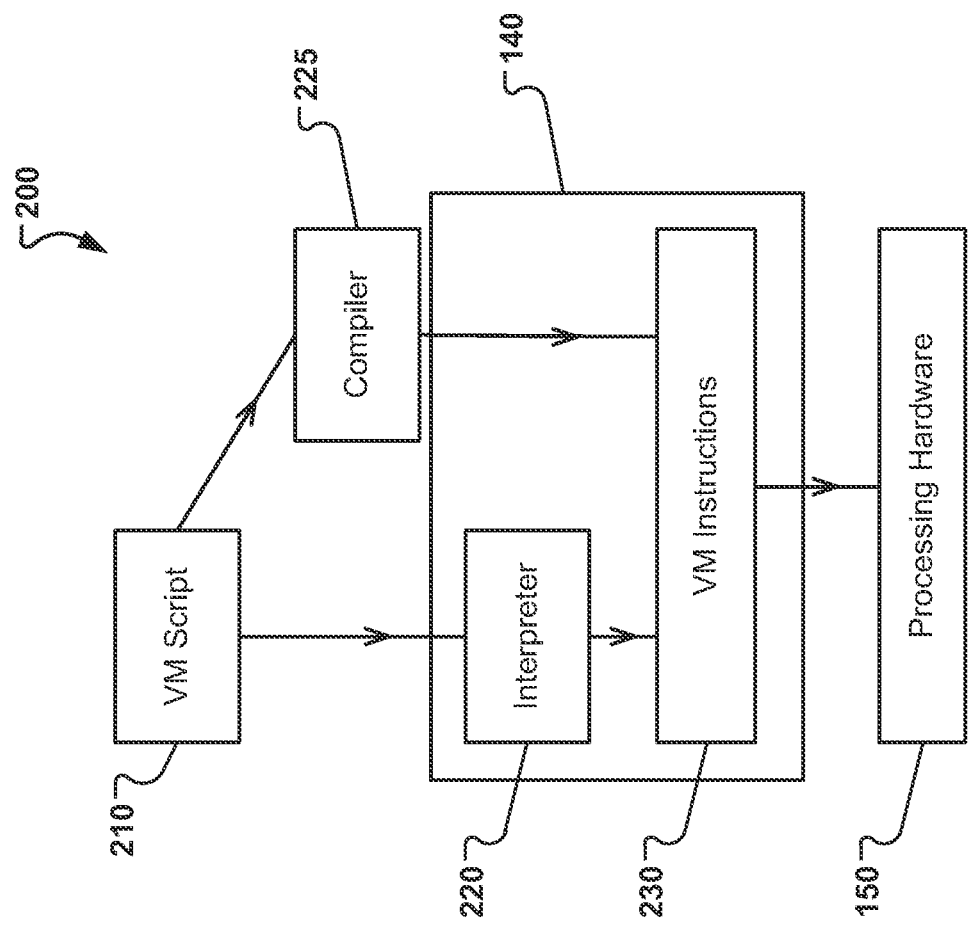
FIG. 2 shows an example of a process for converting and executing a virtual machine source code script.

FIG. 2 shows an example process 200 for converting and executing a virtual machine source code script. A virtual machine (e.g., Lua) is an embeddable scripting language, which can be used for various applications (e.g., games, internet applications, databases, robotics, solid state drive systems (SSD), etc.). The virtual machine and environment can be embedded within the firmware of a SOC. In some implementations, the virtual machine environment can implement application layers (e.g., Portable Operating System Interface (POSIX)) compliant with a set of application specific (e.g., SSD specific) application programming interfaces (APIs). For example, the APIs can provide access through the firmware to low level utilities to perform operations, such as stand-alone product self-test and diagnostics, for example for the manufacturing process of SSD devices. Virtual machine language can implement a register based virtual machine (e.g., Lua) or a stack based virtual machine.

A virtual machine operates based on an instruction set conforming to the virtual machine environment. For example, the Lua virtual machine instruction set includes 38 instructions, each 32 bits wide. The virtual machine instructions corresponding to the virtual machine instruction set can be generated from a virtual machine source code script.

Virtual machine source code scripts (e.g., 210 in FIG. 2), can be provided, for example by a developer, and converted (e.g., by an interpreter) into virtual machine instructions 230, such as virtual machine bytecode for processing. In some implementations, the virtual machine source code script 210 can be downloaded into the embedded virtual machine environment 140 and an internal interpreter 220 (e.g., which runs on the CPU) can convert the virtual machine source code script 210 into virtual machine instructions 230. The converted virtual machine instructions 230 can be passed to the processing hardware 150 for processing of the virtual machine instructions 230.

In some implementations, the virtual machine source code script 210 can be precompiled by an external compiler 225 (e.g., executed on a workstation or computer system) into virtual machine instructions 230 and downloaded into the embedded virtual machine environment 140. The downloaded virtual machine instructions 230 can be passed to the processing hardware 150 (e.g., a virtual machine execution unit) for processing, e.g., decoding and execution, of the virtual machine instructions 230.

Figure 3:
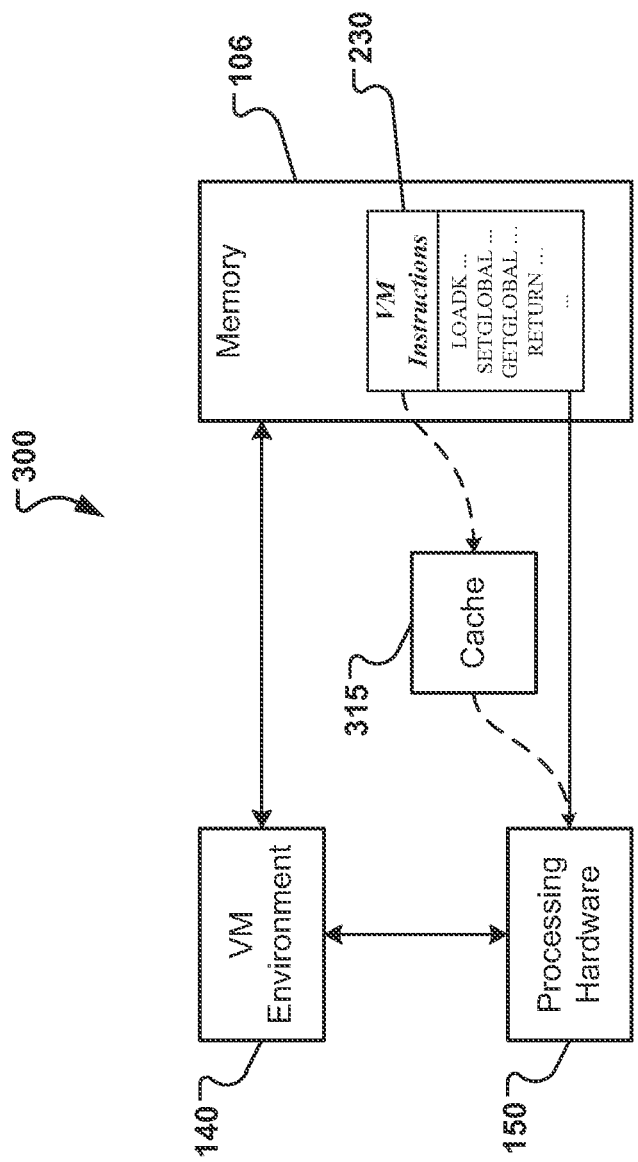
FIG. 3 shows an example of a process for passing virtual machine instructions to a processing hardware.

FIG. 3 shows an example process 300 for passing virtual machine instructions 230 to a processing hardware. The components of a SOC can access memory devices, such as memory device(s) 106 or memory 125, for example through a buffer bus and/or memory interface. The components of the SOC can have individual access and priority rights to the memory device(s) 106. For example, the processing hardware 150 and a CPU that is executing instructions to implement the virtual environment 140 can have access to the same memory device, such as memory device(s) 106 or memory 125. The CPU can save the virtual machine instructions 230 to the memory device. The virtual machine instructions 230 can be generated from a virtual machine source code script, for example, by an internal interpreter or an external compiler as discussed in connection with FIG. 2.

The processing hardware 150 can access the memory device(s) 106 and retrieve the stored virtual machine instructions 230 for processing. Processing the virtual machine instructions 230 can include decoding and executing the virtual machine instructions 230. In some implementations, the CPU can instruct the processing hardware 150 to retrieve and process the virtual machine instructions 230.

In some implementations, the processing hardware 150 can be coupled with an optional cache memory 315 (e.g., 8K bytes) to cache the virtual machine instructions 230. The cache memory 315 can be tightly (i.e., the processing hardware has exclusive access to the cache memory) or loosely (i.e., both, the CPU and the processing hardware have access to the cache memory) coupled with the processing hardware 150. In a loosely coupled configuration, the cache memory can be used by the CPU to cache the virtual machine instructions, or other information (e.g., when no virtual machine instructions are to be executed).

In some implementations, the CPU can save the virtual machine instructions 230 to the memory device(s) 106 and at each memory cycle, a cache manager can retrieve the stored virtual machine instructions 230 from the memory device(s) 106 and cache the virtual machine instructions 230 in the cache memory 315. Thus, the processing hardware 150 can process the virtual machine instructions 230 cached in the cache memory 315 without sharing bandwidth with the memory device(s) 106.

Figure 4:
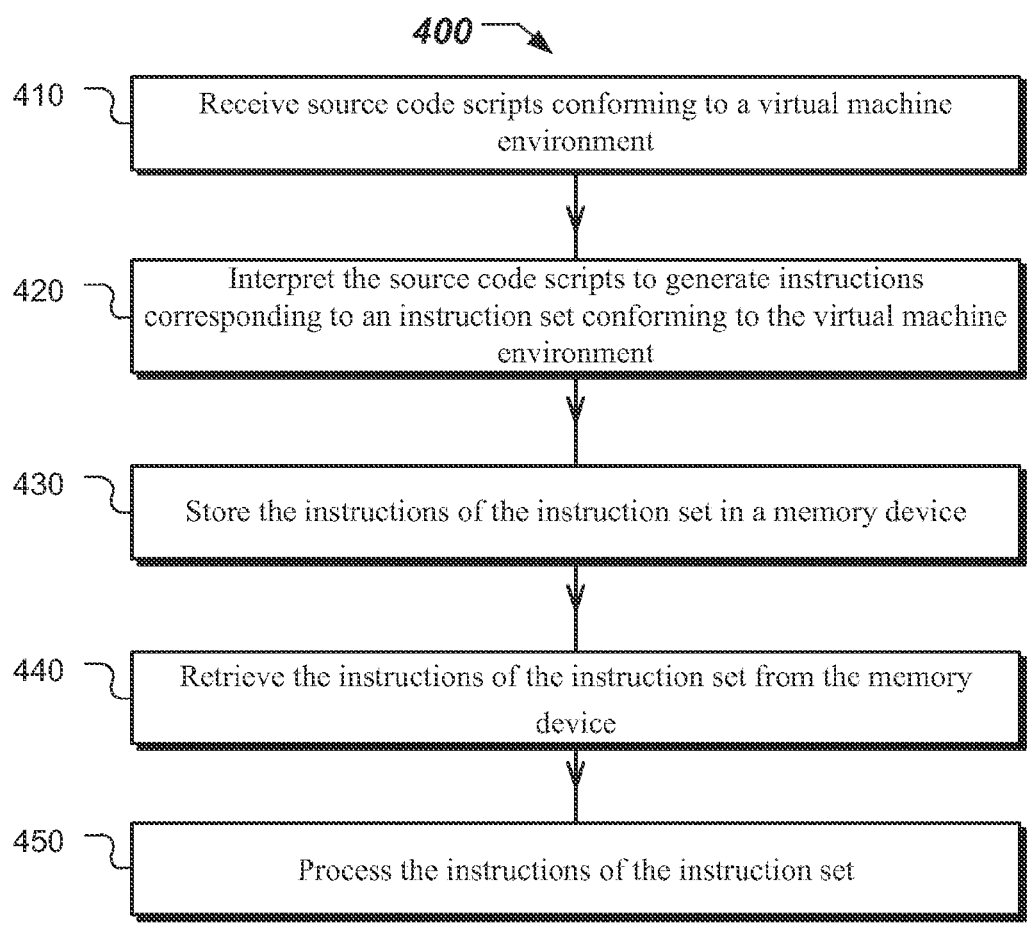
FIG. 4 shows an example of a process for handling a virtual machine source code script.

FIG. 4 shows an example of a process 400 for processing and executing a virtual machine source code script. At 410, source code scripts conforming to a virtual machine environment, such as Lua, can be received. At 420, the virtual machine source code scripts can be converted to generate instructions corresponding to an instruction set conforming to the virtual machine environment. For example, the instruction set can be a Lua virtual machine instruction set including 38 instructions, each 32 bits wide. In some implementations, the conversion of the virtual machine source code scripts can be performed by an internal or external interpreter as discussed in connection with FIG. 2.

At 430, the virtual machine instructions can be saved to a memory device, for example by a CPU executing instructions to implement the virtual machine environment. The memory device can be internal or external to the SOC. At 440, a virtual machine execution unit, such as processing hardware 150, can retrieve the virtual machine instructions from the memory device for processing. In some implementations, the virtual machine instructions can be cached in a memory cache coupled with the virtual machine execution unit as described in connection with FIG. 3.

In some implementations, the CPU can trigger (e.g., by a command) the virtual machine execution unit to retrieve and process the virtual machine instructions. In some implementations, the processing hardware can be triggered to retrieve and process the virtual machine instructions upon the CPU saving the virtual machine instructions to the memory device (e.g., when the memory device is tightly coupled with the virtual machine execution unit). At 450, the virtual machine execution unit can process the virtual machine instructions. Processing can include decoding and executing the virtual machine instructions.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

The implementations described above can also be implemented for other types of non-volatile or persistent memory, which may not be solid state.

What is claimed is:

1. A system on an integrated circuit chip (SOC) for a storage device, the SOC comprising:
    an interface for the SOC;
    a memory device that is separate from a central processing unit (CPU);
    a cache memory device that is separate from the memory device;
    the CPU coupled with the interface and the memory device, the CPU configured to process instructions defined by a first instruction set architecture and configured to write, to the memory device, bytecode representing instructions defined by a second instruction set architecture that is different from the first instruction set architecture, wherein the instructions defined by the second instruction set architecture conform to a predefined virtual machine environment;
    an interpreter, executed by the CPU, the interpreter configured to convert a scripting code, which conforms to the predefined virtual machine environment, to generate the bytecode representing the instructions defined by the second instruction set architecture;
    a cache memory manager, which is tightly coupled to the cache memory device, the cache memory manager configured to:
        after the CPU has written the bytecode to the memory device and based on an instruction from the CPU, retrieves, at each memory cycle, stored bytecode from the memory device;
        writes, at each memory cycle, the stored bytecode to the cache memory device; and
    processing hardware coupled with the interface and the cache memory device, the processing hardware being separate from the CPU and configured to, after the cache memory manager has written the stored bytecode to the cache memory device, retrieve the stored bytecode from the cache memory device, and process the stored bytecode to execute the instructions in the predefined virtual machine environment to cause the processing hardware to perform a self-test of the storage device.

2. The SOC of claim 1, wherein the predefined virtual machine environment is a register based virtual machine environment.

3. The SOC of claim 2, wherein the register based virtual machine environment is a Lua virtual machine environment.

4. The SOC of claim 1, wherein the processing hardware is a micro programmed write/control/store (WCS) device.

5. The SOC of claim 1, further comprising a second central processing unit (CPU) coupled with the interface and configured to process instructions defined by the first instruction set.

6. The SOC of claim 1, wherein the storage device is a solid state drive (SSD).

7. The SOC of claim 1, wherein the CPU is configured to write the bytecode representing the instructions defined by the second instruction set by writing the bytecode representing the instructions defined by the second instruction set to a predefined location of the memory device for storing the instructions for performing the self-test of the storage device.

8. The SOC of claim 1, wherein the cache memory manager is implemented on the CPU.

9. A method for performing a self-test of a storage device that includes a system on an integrated circuit chip (SOC), the method comprising:
- receiving, by an interpreter executed by a central processor unit (CPU), source code scripts that conforms to a predefined virtual machine environment;
- interpreting the source code scripts to generate instructions for performing the self-test of the storage device, the instructions defined by a first instruction set architecture conforming to the predefined virtual machine environment;
- writing, by the CPU, bytecode representing instructions defined by a second instruction set architecture, which is different from the first instruction set architecture, to a memory device that is separate from the CPU, the CPU being configured to process instructions defined by the first instruction set architecture, wherein the instructions defined by the second instruction set architecture conform to the predefined virtual machine environment;
- converting, by the interpreter, the received source code scripts to generate the bytecode representing the instructions defined by the second instruction set architecture;
- after the CPU has written the bytecode to the memory device and based on an instruction from the CPU, retrieving, by a cache memory manager that is tightly coupled to a cache memory device, at each memory cycle, stored bytecode from the memory device;
- writing, by the cache memory manager, at each memory cycle, the stored bytecode to the cache memory device; and
- processing, by processing hardware that 1) is coupled with the interface and cache memory device and 2) is separate from the CPU, the retrieved instructions defined by the second instruction set architecture, after the cache memory manager has written the bytecode to the cache memory device, to perform the self-test of the storage device by:
  - retrieving the stored bytecode from the cache memory device; and
  - processing the stored bytecode.

10. The method of claim 9, wherein the predefined virtual machine environment is a register based virtual machine environment.

11. The method of claim 10, wherein the register based virtual machine environment is a Lua virtual machine environment.

12. The method of claim 9, wherein the processing hardware is a micro programmed write/control/store (WCS) device.

13. The method of claim 9, wherein the storage device is a solid state drive (SSD).

14. The method of claim 9,
- wherein receiving the source code scripts conforming to the predefined virtual machine environment further comprises receiving the source code scripts conforming to the predefined virtual machine environment by a compiler that is separate from the SOC,
- wherein interpreting the source code scripts to generate the instructions for performing the self-test of the storage device comprises interpreting the source code scripts by the compiler,
- and wherein the method further comprises receiving, by the CPU of the SOC, the instructions for performing the self-test of the storage device from the compiler.

* * * * *